United States Patent
Jacobs

(10) Patent No.: US 6,715,094 B2
(45) Date of Patent: Mar. 30, 2004

(54) MULT-MODE I/O INTERFACE FOR SYNCHRONIZING SELECTED CONTROL PATTERNS INTO CONTROL CLOCK DOMAIN TO OBTAIN INTERFACE CONTROL SIGNALS TO BE TRANSMITTED TO I/O BUFFERS

(75) Inventor: Jason Jacobs, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 09/747,617

(22) Filed: Dec. 20, 2000

(65) Prior Publication Data

US 2002/0078273 A1 Jun. 20, 2002

(51) Int. Cl.[7] .............................. G06F 1/12; G06F 1/04; G06F 3/00
(52) U.S. Cl. ........................ 713/400; 713/600; 710/58; 710/105
(58) Field of Search ................................ 713/400, 600; 710/58, 61, 105

(56) References Cited

U.S. PATENT DOCUMENTS

| | | | | |
|---|---|---|---|---|
| 4,878,233 A | * | 10/1989 | Hayashi | 375/368 |
| 5,163,069 A | * | 11/1992 | Hayashi | 375/357 |
| 5,256,994 A | * | 10/1993 | Langendorf | 331/16 |
| 5,887,039 A | * | 3/1999 | Suemura et al. | 375/365 |
| 5,909,563 A | * | 6/1999 | Jacobs | 710/305 |
| 5,919,254 A | * | 7/1999 | Pawlowski et al. | 710/104 |
| 6,112,307 A | * | 8/2000 | Ajanovic et al. | 713/400 |
| 6,188,255 B1 | * | 2/2001 | Mann | 327/113 |
| 6,269,136 B1 | * | 7/2001 | Hansen et al. | 375/354 |
| 6,336,159 B1 | * | 1/2002 | MacWilliams et al. | 710/105 |
| 6,393,502 B1 | * | 5/2002 | Meyer et al. | 710/58 |
| 6,505,149 B1 | * | 1/2003 | Griswold et al. | 703/14 |
| 6,539,444 B1 | * | 3/2003 | Kondo et al. | 710/110 |
| 6,584,575 B1 | * | 6/2003 | Meyer et al. | 713/400 |

FOREIGN PATENT DOCUMENTS

JP         3-195271      *   8/1991

OTHER PUBLICATIONS

Arabi et al., "Modeling, Simulation, and Design Methodology of the Interconnect and Packaging of an Ultra–High Speed Source Synchronous Bus", IEEE 1998, pp 8–11.*

* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

A multi-mode I/O interface includes a transmit state machine receiving a core clock signal, a control clock signal and a transmit signal. The state machine generates a state signal indicating a state of the I/O interface in a next clock cycle. A pattern generator includes pattern generation units. Each pattern generation unit selects, in response to the state signal and an I/O protocol signal, N-bit interface control patterns from a plurality of microcode N-bit interface control patterns contained in the pattern generation units. A serialization unit then serializes the selected N-bit interface control patterns. A synchronization unit synchronizes the control patterns into a control clock domain to form interface control signals generated by the multi-mode I/O interface. The interface control signals are transmitted to data buffers and strobe buffers to enable transmission and receipt of data in accordance with an I/O protocol indicated by the I/O protocol signal.

26 Claims, 16 Drawing Sheets

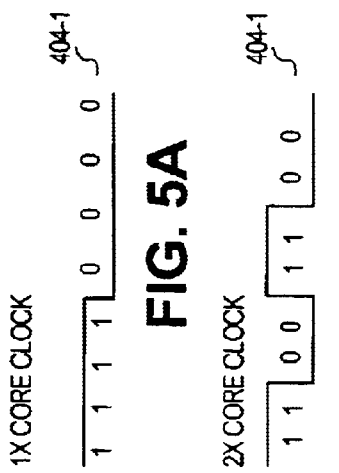
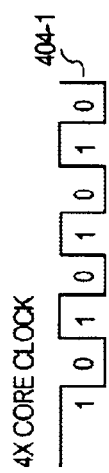
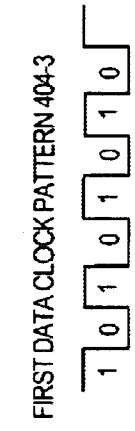
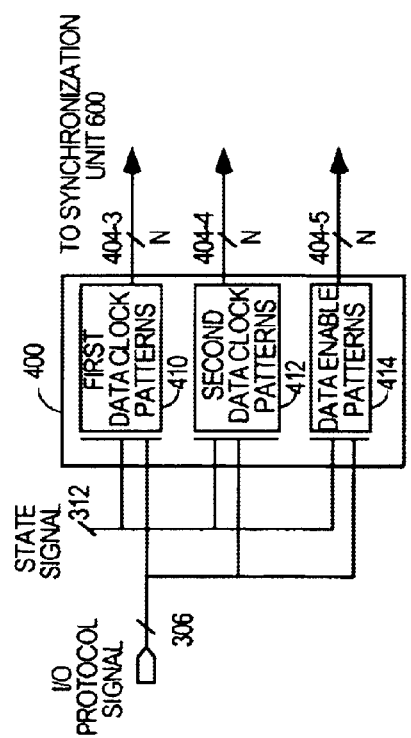

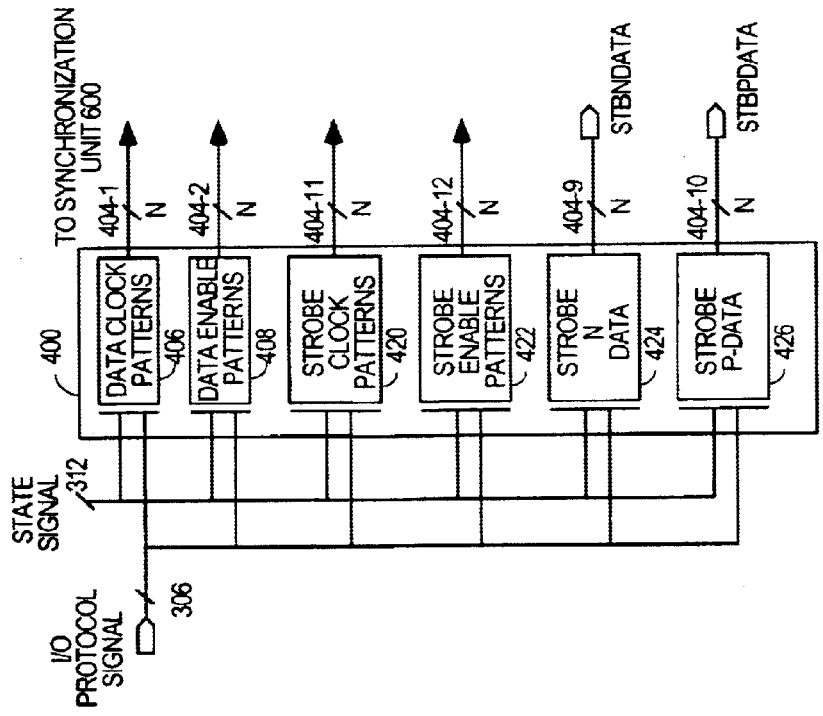

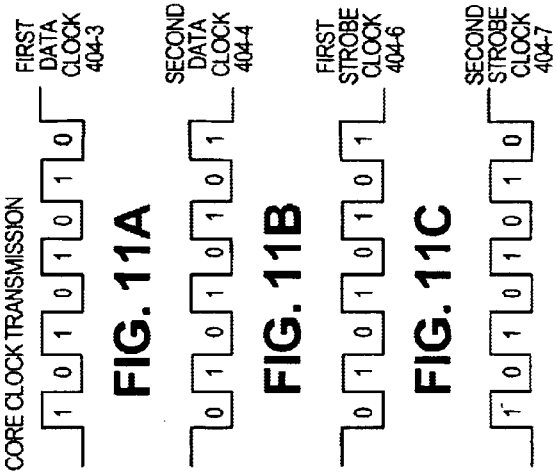
FIG. 11A
FIG. 11B
FIG. 11C
FIG. 11D
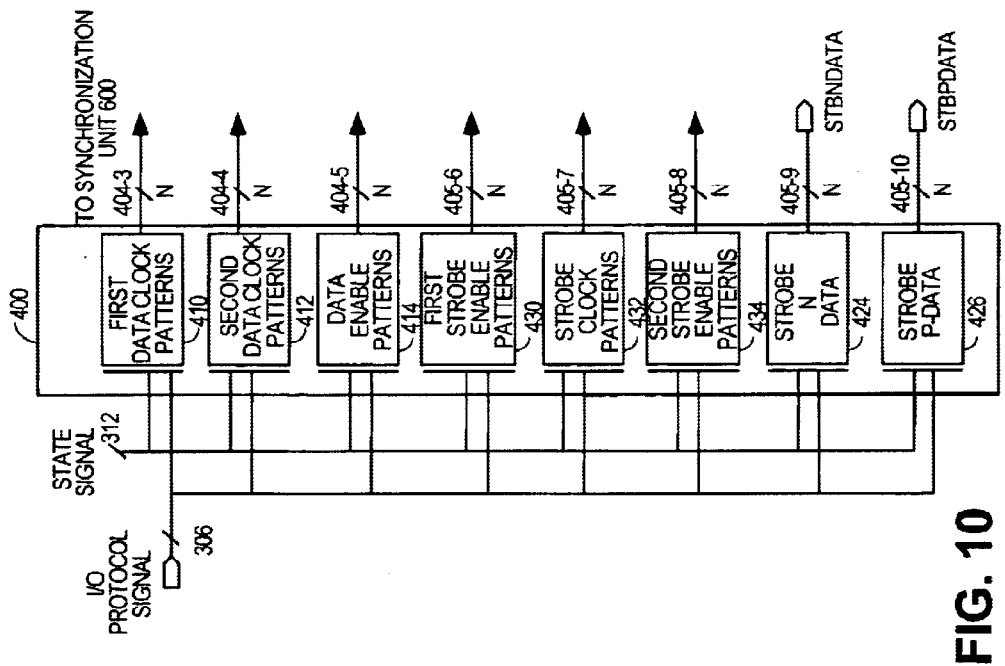
FIG. 10

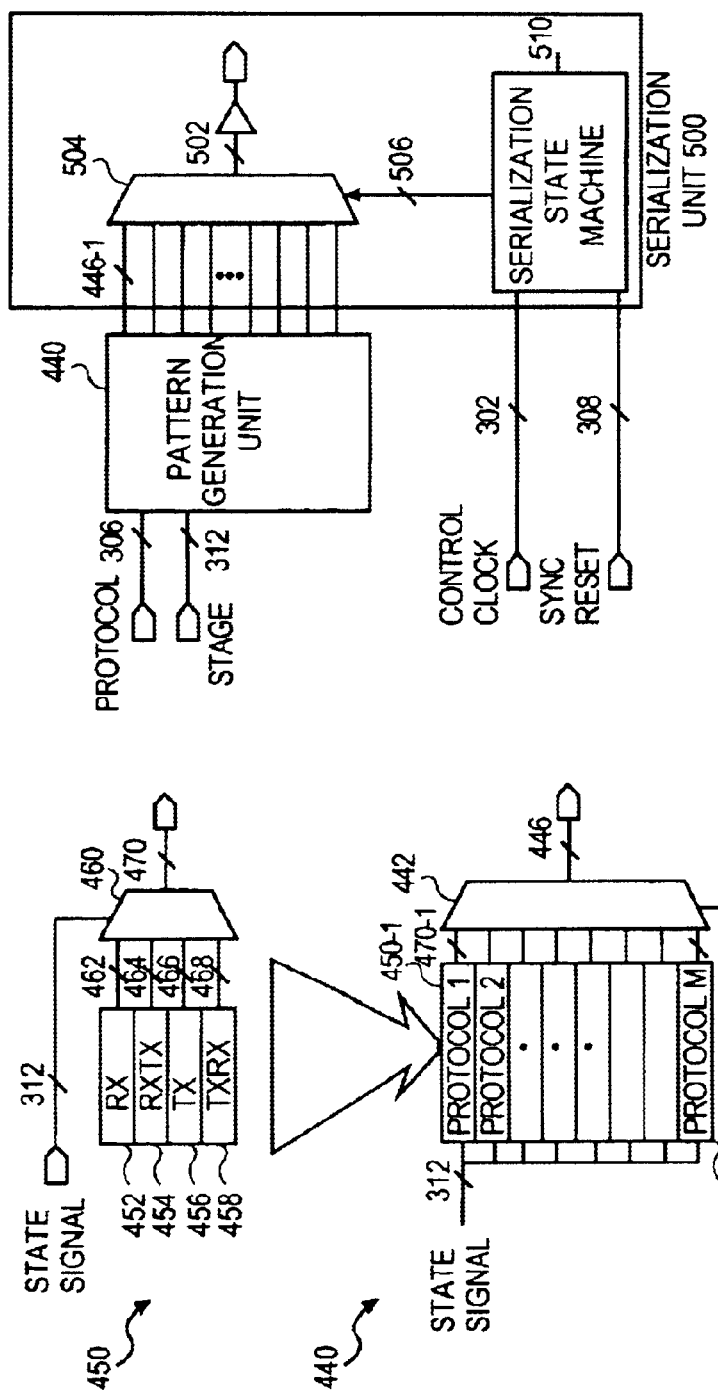

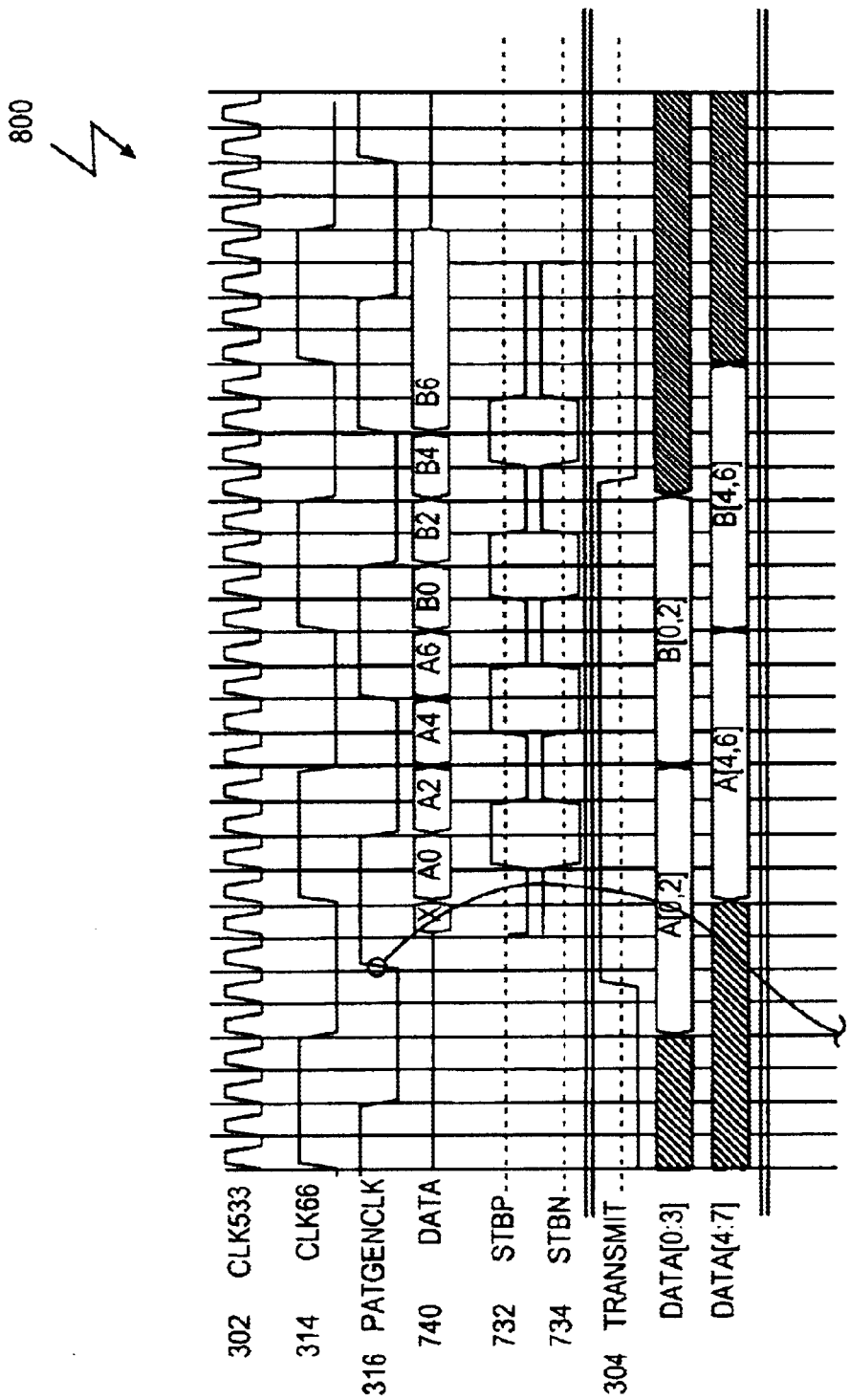

MULT-MODE I/O INTERFACE FOR SYNCHRONIZING SELECTED CONTROL PATTERNS INTO CONTROL CLOCK DOMAIN TO OBTAIN INTERFACE CONTROL SIGNALS TO BE TRANSMITTED TO I/O BUFFERS

FIELD OF THE INVENTION

The present invention relates generally to I/O (input/output) interfaces. In particular, the present invention relates to a method and apparatus for controlling a multi-mode I/O interface.

BACKGROUND OF THE INVENTION

The design of computer hardware components which can function within both the work station markets, as well as the server computer markets, is generally regarded as a desired goal. However, peripheral components which interface with a designed hardware component vary depending on whether the hardware component is functioning within a work station environment or a server environment. Depending on the type of peripheral component, input/output (I/O) communication with the various peripheral components requires the ability to communicate with various interface protocols.

For example, referring to FIGS. 1A and 1B, a memory controller hub (MCH) 110 is depicted as configured within a work station platform (FIG. 1A) or a server platform (FIG. 1B). Referring to FIG. 1A, the memory controller hub 110, within a work station platform 100, can include a front side bus 104 for interfacing with one or more central processing units (CPU) 102 (102A, 102B, . . . 102N). The memory controller hub 110 may also include a Rambus™ channel 120 for interfacing with one or more RAM memories 120 (120A, . . . 120N). The memory controller hub 110 is also coupled to an I/O controller hub (ICH) 130 which can interface with various peripheral components including peripheral component interfaces (PCI) devices, parallel port devices or integrated drive electronics (IDE) components. In addition, the memory controller hub 110 may include one or more graphics ports 124 (124A, . . . , 124N) for coupling to one or more graphics cards 126 (126A, . . . 126N).

Referring to FIG. 1B, a memory controller hub 210 is depicted as configured within a server platform 200. The memory controller hub 210 is configured more or less as configured in the work station platform 200, including a front side bus 204 for coupling to one or more CPUs 202 and including RAM bus channels 220, 222. The difference is that in the server platform, PCI is a vital component, whereas in the work station platform, connections to various graphics devices via graphics cards and graphics ports such as, for example, accelerated graphics ports (AGP), is desired by consumers. Based on the descriptions of the memory controller hubs 110 and 210, as depicted in both the work station platform 100 and a server platform 200, it would appear that designing of a memory controller hub that can function in both work station platforms as well as server platforms would simply require a memory controller hub capable of supporting interface protocols including both AGP protocols as well as interface protocols, such an a parallel-terminated, source-synchronous interface protocol. Unfortunately, the design of a hardware component which is capable of interfacing with various peripheral components and support the various (input/output) I/O protocols which run the peripheral components is complicated by the various types of signaling protocols implemented by the various I/O protocols.

The various I/O protocols which are supported may be either common-clock protocols or source-synchronous protocols. As known to those skilled in the art, source-synchronous I/O protocols refer to protocols wherein the data and the timing information are transported as a group. Also, depending on the protocol, the signaling may be series terminated or parallel terminated. For source-synchronous protocols, the strobe signals can be complimentary, negative edge driven, rising edge driven or single strobe. In addition, the I/O protocol may require transmission at N-times a core clock frequency.

In summary, the computer hardware components designer must analyze various characteristics of each protocol, which the component will support. The designer must consider the relationship of the data transitions to the I/O clock, the relationship of the strobe transitions to the I/O clock and more importantly, to the data transitions. He must determine the strobe patterns that indicate valid data. Finally, the relationship of the output enable of the strobes and data signals, with respect to the first and last transition for a source terminated protocols, must also be considered. In other words, each protocol has differing electrical and logical specifications. The logical behavior of each protocol can be uniquely described by examining the relationship of the data, strobes, and transmission rates to each other.

Previous source-synchronous I/O designs were designed for either a single protocol or a few related protocols. For example, in the case of a source-synchronous design incorporating both accelerated graphics protocols 4× (four times transmission frequency) and accelerated graphics protocol 2× (two times transmission frequency), the design was implemented by changing the clock frequency and adding arcs to the state machines responsible for serializing outbound data. While this approach was sufficient for AGP design, the control structure required for an I/O interface using two unrelated protocols, such as AGP and a parallel-terminated, source-synchronous interface protocol, becomes more difficult.

Therefore, there remains a need to overcome one or more limitations in the above described existing art.

BRIEF DESCRIPTION OF THE DRAWINGS

The features, aspects, and advantages of the present invention will become more fully apparent from the following detailed description and appended claims when taken in conjunction with accompanying drawings in which:

FIG. 4 depicts a block diagram illustrating a pattern generator according to an embodiment of the present invention;

FIGS. 5A–5C depict timing diagrams illustrating the functionality of the pattern generator according to the embodiment of the present invention;

FIG. 6 depicts a block diagram illustrating a pattern generator according to a further embodiment of the present invention;

FIGS. 7A and 7B depict timing diagrams illustrating the functionality of the pattern generator according to the further embodiment of the present invention;

FIG. 8 depicts a block diagram illustrating a pattern generator according to a further embodiment of the present invention;

FIGS. 9A–9F depict timing diagrams illustrating the functionality of the pattern generation unit according to the further embodiment of the present invention;

FIG. 10 depicts a block diagram illustrating a pattern generator in accordance with an exemplary embodiment of the present invention;

FIGS. 11A–11D depict timing diagrams illustrating the functionality of the pattern generation unit in accordance with the exemplary embodiment of the present invention;

FIG. 12 depicts a block diagram illustrating a pattern generation unit in accordance with an exemplary embodiment of the present invention;

FIG. 13 depicts a block diagram illustrating a serialization unit in accordance with an embodiment of the present invention.

FIGS. 19A and 19B depict timing diagrams illustrating the functionality of the multi-mode I/O interface in accordance with the exemplary embodiment of the present invention.

DETAILED DESCRIPTION OF THE INVENTION

A method and apparatus for controlling a multi-mode I/O interface are described. In the following detailed description, for the purposes of explanation, numerous specific details are set forth in order to provide a thorough understanding of the present invention. It will be apparent, however, to one skilled in the art that the present invention may be practiced without some of these specific details. For example, various signals, layout patterns, memory cell configurations and circuits, and logic circuits may be modified according to the teachings of the present invention. The following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures, devices, and techniques are shown in block diagram form in order to avoid obscuring the details of the present invention.

System Architecture

Figure 1A:
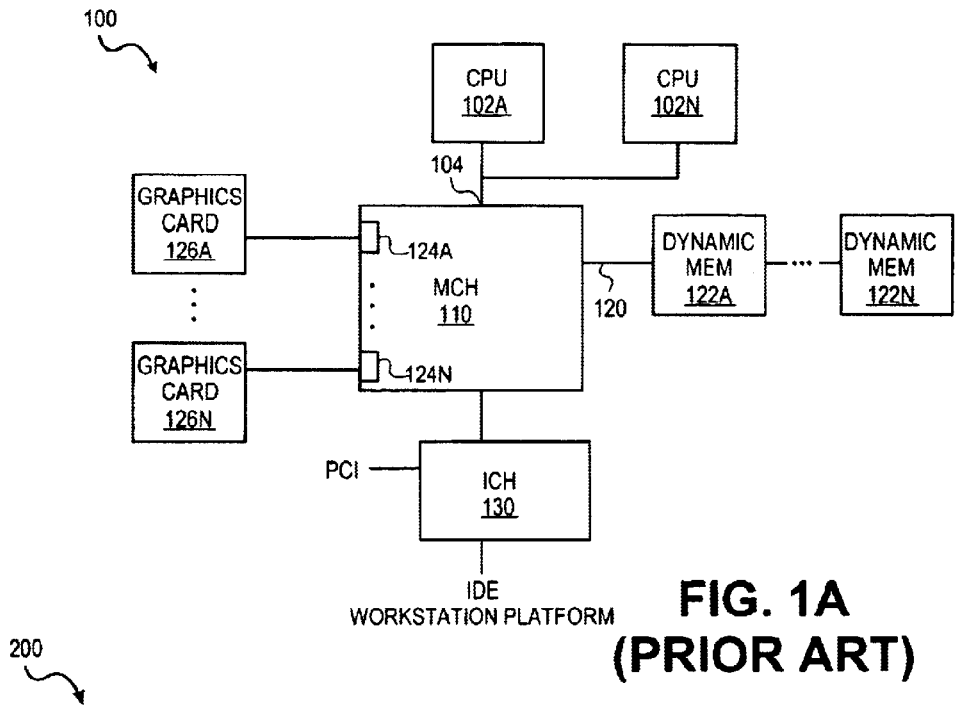
FIG. 1A depicts a block diagram of a computer workstation platform as known in the art.
Figure 1B:
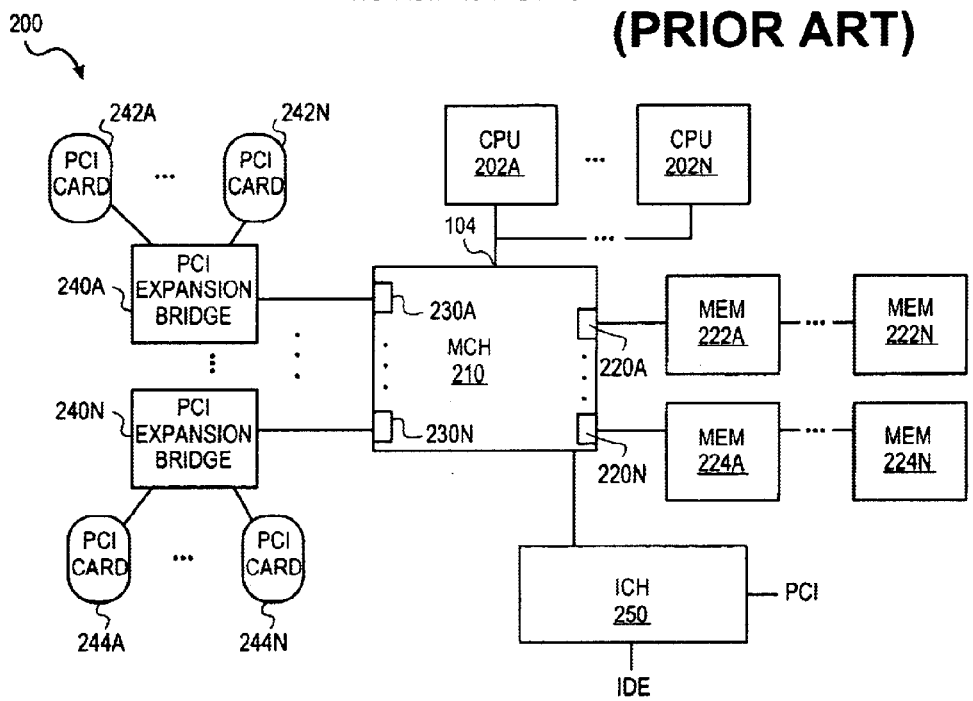
FIG. 1B depicts a block diagram illustrating a computer server platform as known in the art.
Figure 2:
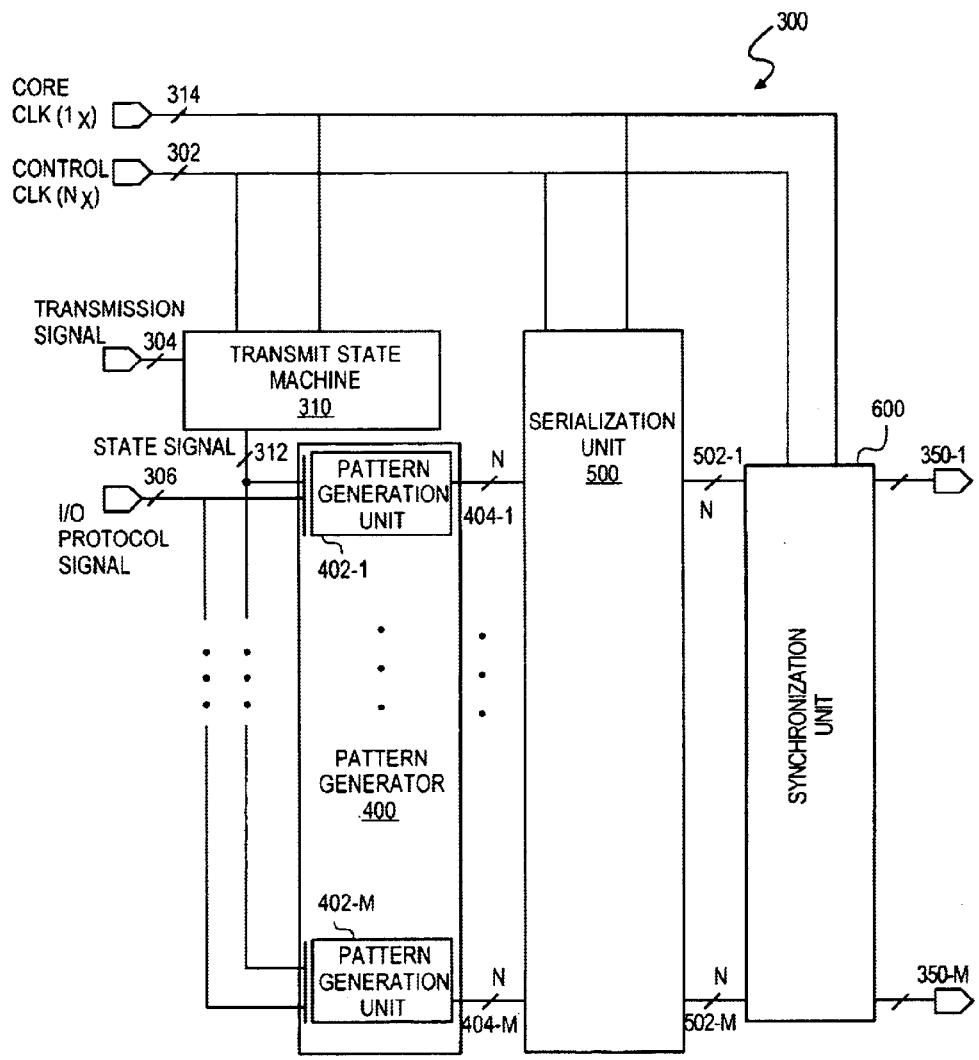
FIG. 2 depicts a block diagram illustrating a multi-mode I/O interface according to an embodiment of the present invention.

Referring now to FIG. 2, a block diagram of a multi-mode I/O interface 300 is depicted. The multi-mode I/O interface 300 is controlled through a mechanism which enables the behavior of the interface 300 to be defined through easily modifiable "microcode". As a result, the multi-mode interface 300 may be reconfigured or modified without altering any interface hardware. The hardware utilized by the multi-mode interface 300 includes custom I/O buffers such as data and strobe buffer. The microcode is a set of N-bit patterns that define the relationship of data and timing signals transmitted by the multi-mode I/O interface 300. Using the "microcode" N-bit interface control patterns enables receipt and transmission of data in accordance with one or more I/O protocols supported by the multi-mode I/O interface 300.

The multi-mode I/O interface 300 includes a transmit state machine 310, which receives a core clock signal 314 and a control clock signal 302. The transmit state machine 310 also receives a transmit signal 304. Using the core clock signal 314, the control clock signal 302 and the transmit signal 304, the transmit state machine 310 generates a state signal 312 indicating a state of the multi-mode interface 300 in a next core clock cycle, as further described with reference to FIG. 3. The interface 300 further includes a pattern generator 400 containing one or more pattern generation units 402 (402-1, 402-2, . . . , 402-M). The one or more pattern generation units 402 each contain one or more N-bit interface control patterns or "microcode", as described above.

In response to receiving the state signal 312 and an I/O protocol signal 306, each pattern generation unit 402 selects an N-bit control pattern from the plurality of N-bit control patterns contained in the one or more pattern generation units 402. A serialization unit 500 receives the one or more N-bit control patterns 404 (404-1, . . . , 404-M) selected by the pattern generation units 402. Once received, the one or more N-bit control patterns 404 are serialized by the serialization unit 500. Finally, a synchronization unit 600 receives the one or more N-bit control patterns from the serialization unit 500 and synchronizes the control patterns 502 (502-1, . . . , 502-M) into a control clock domain to form one or more interface control signals 350 (350-1, . . . , 350-M) generated by the multi-mode I/O interface 300. The synchronization unit 600 then transmits the one or more interface control signals 350 to I/O buffers (not shown) to enable transmission and receipt of data in accordance with an I/O protocol indicated by the I/O protocol signal 306. In general, $\log_2$ (N) signal are required to support N-protocols.

Figure 3:
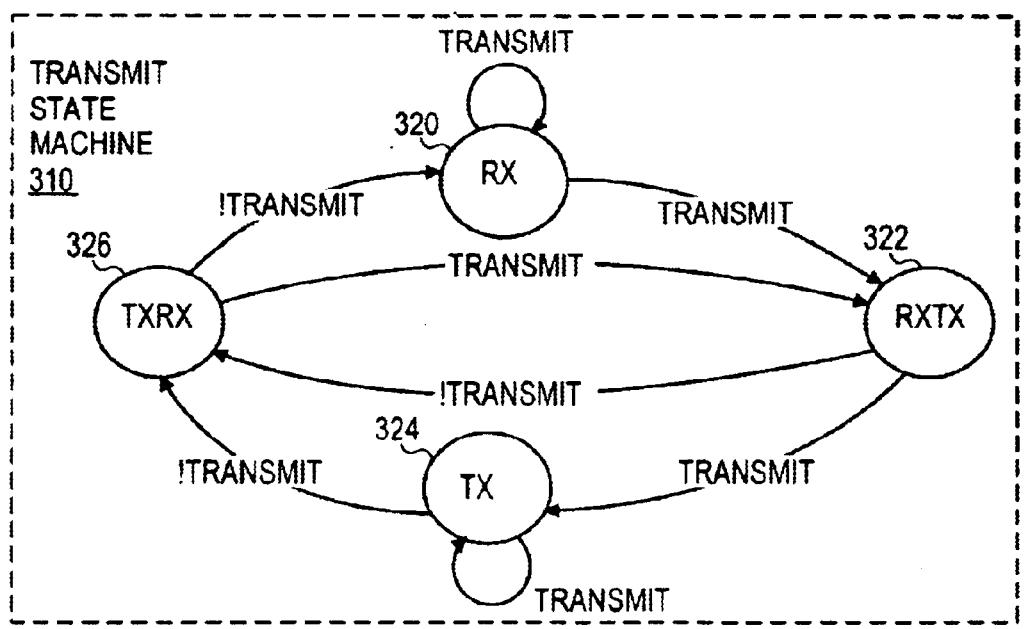
FIG. 3 depicts a state machine illustrating the functionality of a transmit state machine utilized by the pattern generator in accordance with an exemplary embodiment of the present invention.

Referring now to FIG. 3, a state transition diagram, illustrating the functionality of the transmit state machine 310 is depicted. The embodiment described with reference to FIG. 3 assumes an I/O protocol having four transmit states. The transmit states include: receiving mode (RX); receive to initial transmit boundary (RXTX); continue transmit (TX); and transmit to receive boundary (TXRX). The transmit signal 304 is received by the transmit state machine 310. When the transmit signal 312 is asserted (Transmit), the I/O interface 300 will begin transmitting a next core clock cycle. As indicated with reference to FIG. 2, a core clock 314 and a control clock 302 are utilized by the multi-mode I/O interface 300. The control clock runs at N times the frequency of the core clock. As a result, the control clock 302 allows the I/O interface to utilize N-phases of the control clock 302, which occur within one phase of the core clock 314. The state signal 312 is used to encode the dynamic behavior of the interface control signals 350 depending on whether the interface is transmitting, receiving or at a boundary.

Referring again to FIG. 3, assuming we begin in receive mode RX, the assertion of the transmit signal 304 continues along from the receive state RX 320 to the receive to initial transmit boundary RXTX 322. However, if the transmit signal 312 is deasserted (!Transmit), the transmit state machine 310 remains in RX mode 320. From the receive to initial transmit boundary RXTX state 322, the assertion of the transmit signal will move us from the RXTX state 322 to a continue transmit state TX 324. However, deassertion of the transmit signal 304 results in a transition to the TXRX state 326. The assertion of the transmit signal allows the transmit state machine 310 to remain in transmit mode TX 324. Once the transmit signal 304 is deasserted, the state machine 310 transitions from transmit mode TX mode 324 to the transmit to receive boundary TXRX state 326. From TXRX state 326, the deassertion of the transmit signal moves the transmit state machine 310 back to the receive mode RX state 320. The resulting states generated by the transmit state machine 310 are encoded into the state signal 312 and transmitted to the various pattern generation units 402. Alternatively, the transmit state machine 310 may sample the transmit signal 304 in response to a pre-clock signal, which is sampled at 3.5 ns before the rising edge of the core clock, assuming the core clock is running at 66 MHz with the control clock running at 533 MHz, or for N=8. This allows two control cycles for pattern generation and serialization, as described in further detail below.

Referring now to FIG. 4, a block diagram of the pattern generator 400 is depicted in accordance with a further embodiment of the present invention. The pattern generation unit 400 includes a data clock pattern generation unit 406 and a data enable pattern generation unit 408. The data clock pattern generation unit 406 contains a series of first data clock control patterns for each I/O protocol supported by the multi-mode I/O interface 300. In other words, the series of data clock control patterns include an N-bit data clock control pattern for each transmission state defined by the state signal 312 and described with reference to FIG. 3. The data enable pattern generation unit also contains a series of data enable control patterns for each protocol supported by the multi-mode I/O interface 300. The series of data enable control patterns also include an N-bit data enable control pattern for each transmission state defined by the state signal 312. As a result, a data buffer (not shown) receives a clock signal utilizing the first data clock pattern and an enable signal utilizing the data enable patterns based on the I/O protocol supported by the data buffer. In other words, the N-bit microcode control patterns are selected to enable standard I/O protocols or common clock protocols supported by the multi-mode I/O interface 300.

Referring now to FIGS. 5A–5C, timing diagrams are depicted for illustrating the functionality of the pattern generator 400. Referring to FIG. 5A, the data clock patterns 404-1 can be used to generate a data clock signal that causes a data buffer to transmit data at the core clock 314 frequency. Alternatively, referring to FIG. 5B, the N-bit control pattern 404 may be used to generate a data clock signal to cause the data buffer to run at twice the frequency of the control clock 314 or at four times the control clock frequency as depicted in FIG. 5C.

Referring now to FIG. 6, the pattern generator 400 is depicted in block diagram form in accordance with a further embodiment of the present invention. In this embodiment, the pattern generator 400 is utilized to generate data clock control signals to direct a data buffer to transmit data at up to eight times the core clock frequency, as described with reference to FIGS. 7A and 7B. The pattern generation unit 400 includes a first data clock pattern generation unit 410 and a second data clock pattern generation unit 412. In response to the state signal 312 and the I/O protocol signal 306, each pattern generation unit 406 and 408 selects an N-bit first data clock pattern 404-3 and an N-bit second data clock pattern 404-4. The first 404-3 and second 404-4 N-bit clock patterns form a first data clock signal and a second data clock signal for the data buffer to transmit and receive data.

Referring now to FIGS. 7A and 7B, a data buffer receives the first N-bit data clock pattern 404-3 as a first data clock and the second data clock pattern 404-4 as a second data clock. Using two data clock signals enables the data buffer to transmit data at N times the core clock frequency by responding to each rising edge of the first N-bit control data clock control pattern 404-3 and the second data clock control pattern 404-4. As a result, the pattern generator 400, as depicted with reference to FIG. 6, enables support of common-clock I/O protocols transmitting at N times the core clock frequency by the multi-mode I/O interface 300.

Referring now to FIG. 8, the pattern generator 400 is depicted in accordance with an embodiment of the present invention for support source synchronous I/O protocols. The pattern generator 400 includes the data clock pattern generation unit 406 and the data enable pattern generation unit 408, as described with reference to FIG. 4. The pattern generator 400 further includes a strobe clock pattern generation unit 420, and a strobe enable pattern generation unit 422. In response to an I/O protocol signal 306 and the state signal 312, the strobe clock pattern generation unit 420 selects one of a series of strobe clock control patterns coinciding with the I/O protocol indicated by the I/O protocol signal 306. Once the I/O protocol is selected, an N-bit strobe clock control pattern is selected from the series of strobe clock control patterns for a transmission state defined by the state signal 312. The N-bit strobe clock pattern 404-11 is then transmitted to the serialization unit 500 to eventually form a strobe clock signal for enabling transmission of data by a strobe buffer. The pattern generation unit 400 further includes a strobe N data pattern generation unit 424 and a strobe P data pattern generation unit 426.

The strobe N 424 and strobe P pattern 426 generation units are used to generate a strobe pair 404-9 and 404-10 in order to enable support of source synchronous I/O protocols by the multi-mode I/O interface 300. Each of the strobe pattern generation units 424 and 426 contain a series of N-bit strobe control signals. The N-bit strobe control signals may be used to generate, for example, a complementary strobe pair, identical strobe pairs offset by 180 degrees or single strobe pairs, depending on the I/O protocol indicated by the I/O protocol signal 306 and the selected transmission state as indicated by the state signal 312. The strobe pair (STBNDATA 404-9 and STBPDATA 404-10) are transmitted along with the N-bit strobe clock pattern 404-11 to the various strobe buffers in order to enable transmission and receipt of data at up to four times the control clock frequency, as depicted with reference to FIGS. 9A–9F. The data clock and N-bit pattern 404-6 and the strobe clock N-bit pattern 404-8 are depicted as complementary patterns with reference to FIGS. 9A–9F in order to generate data interface signals and strobe interface signal. However, these interface signals are received in quadrature (90 degrees out of phase) with one another once serialized by the serialization unit 500 and synchronized into a clock frequency using the synchronization unit 600.

Referring now to FIG. 10, a block diagram of an exemplary embodiment of the pattern generation unit 400 is depicted for implementing source synchronous I/O protocols, which can transmit data at up to N times the core clock frequency. In order to implement N-times core clock transmission, the pattern generator includes a first strobe clock pattern generation unit 430 and second strobe clock pattern generation unit 432. The pattern generator 400 also includes the data clock pattern generation units 410 and 412 and data enable pattern generation unit 414, as described with reference to FIG. 6. Also included are the strobe N pattern generation unit 424 and store P pattern generator 426.

Data transmission at N times the core clock frequency is described with reference to FIGS. 11A–11D for N=8. The first data clock control pattern 404-3 and second data clock control pattern 404-4 are complementary to one another in order to enable a data buffer to transmit data at eight times the core clock frequency in response to each rising edge of the first data clock pattern 404-3 and the second data clock pattern 404-4 as depicted with reference to FIGS. 11A and 11B. The first strobe clock control pattern 404-5 and second strobe clock pattern 404-7 are also complementary and used by a strobe buffer to transmit at eight times the core clock frequency by responding to each rising edge of the first data clock strobe pattern 404 and second strobe clock pattern 404-7, as depicted with reference to FIGS. 11C and 11D.

Referring now to FIG. 12, a block diagram of an exemplary pattern generation unit 440 is depicted. The pattern generation unit 440 is implemented using a two stage input selection device, such as, for example, a two stage multiplexor gate. The first stage multiplexor gate 440 includes a plurality of entries 450 (450-1, . . . , 450-M) for each I/O protocol supported by the multi-mode I/O interface 300. The M protocols described in this embodiment 450 can include as many protocols as desired by or required for the specific implementation. Each I/O protocol entry 450 forms a second stage input selection device 450, such as a multiplexor gate. The input selection device 450 includes an entry for each transmit state utilized by the specific I/O protocol. For example, the input selection device 450 includes an entry for the transmission states as described with reference to FIG. 3, including an RX state 452, an RXTX state 454, a TX state 456 and a TXRX state 458. Consequently, in response to the I/O protocol signal 306, the pattern generator 440 selects an entry 450 corresponding with a selected I/O protocol. Once the entry 450 is selected, the entry or second stage input selection device 450 selects an N-bit control pattern 470 in response to state signal 312 within the selected I/O protocol entry 450. The N-bit control pattern 470 is then transmitted to the serialization unit 500.

Referring now to FIG. 13, a serialization unit 500 according to an embodiment of the present invention is depicted. The serialization unit 500 receives an N-bit control pattern 446 (446-1, 446-2, . . . 446-M) from each pattern generation unit, for example the pattern generation unit 440. The serialization unit 500 includes a serialization selection device 504 for each control pattern generation unit (504-1, . . . , 504-M) contained within the pattern generator 400. Once an N-bit control pattern 446 is selected by the pattern generation unit 440 in response to the I/O protocol signal 306 and the state signal 312, the N-bits of the control pattern 446 are then selected sequentially on every rising edge of control clock 302 in response to mux selects 506 generated by a serialization state machine 510. The input to the serialization selection device 504 are sequentially selected on every control clock, thereby serializing the N-bit patterns into a control clock domain.

Figure 14:
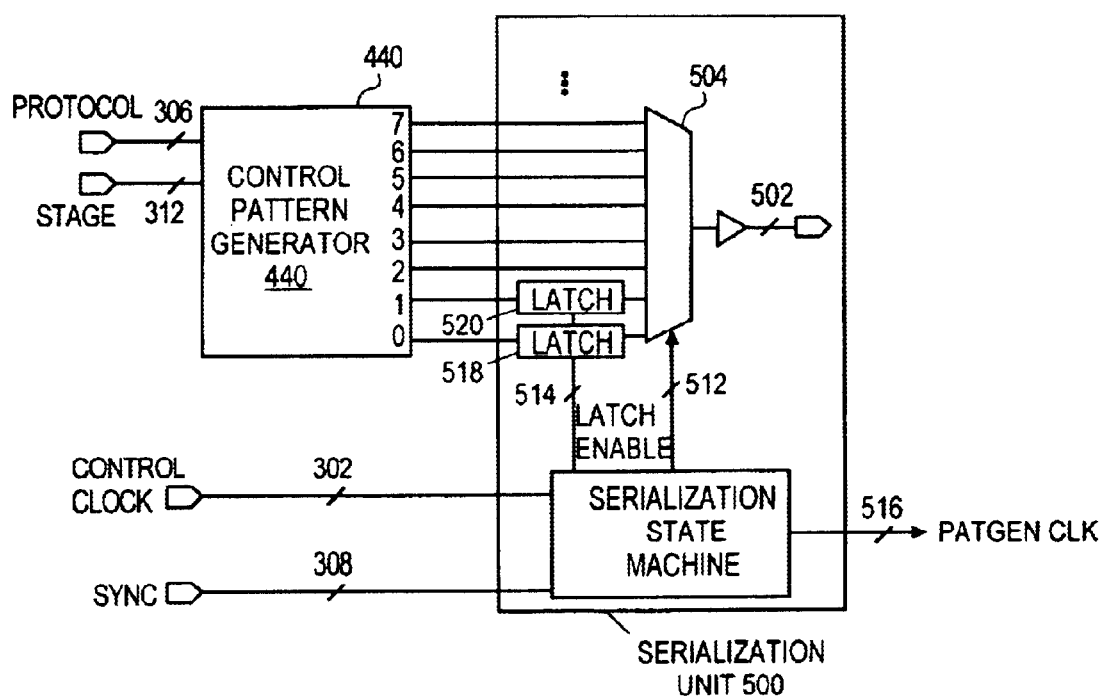
FIG. 14 depicts a block diagram illustrating a synchronization unit in accordance with an exemplary embodiment of the present invention.

Referring now to FIG. 14, an exemplary embodiment of the serialization unit 500 is depicted for N=8. The serialization selection device 504 selects the N-bits of the control pattern 446 in reverse order from bit 7 down to bit 0. The serialization state machine 510, which controls the selection of the bits of the control pattern 446, is described with reference to FIG. 15.

Figure 15:
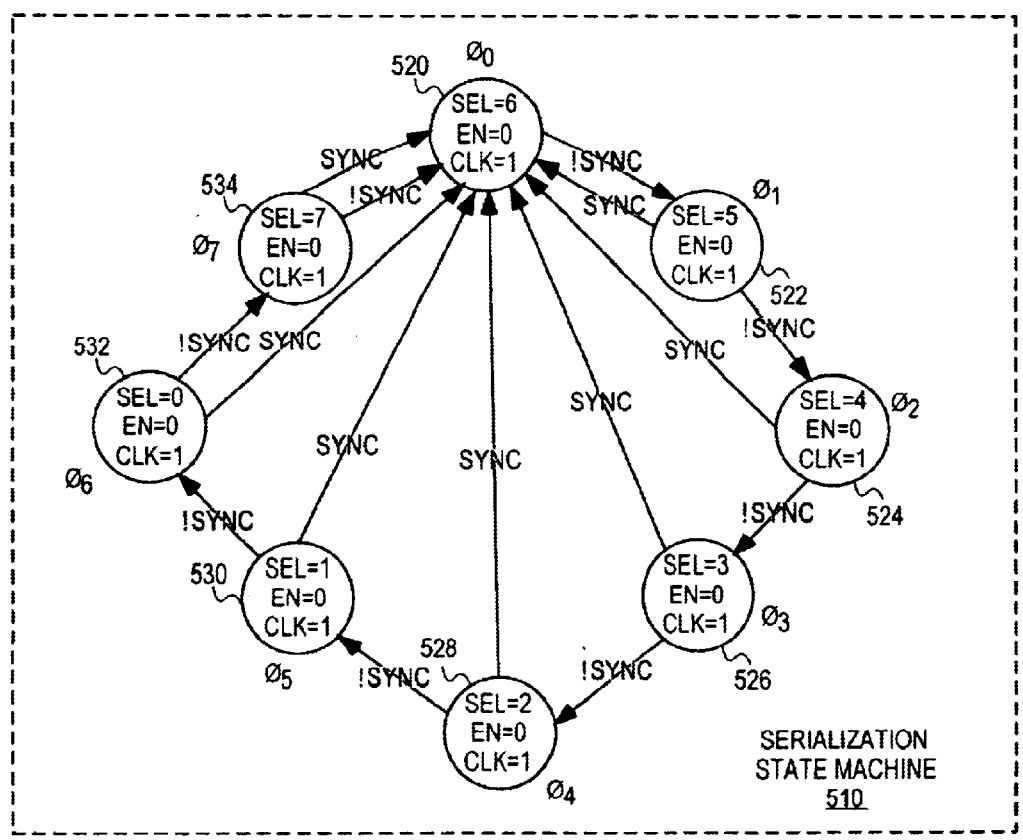
FIG. 15 depicts a state machine illustrating the functionality of a serialization state machine utilized by the synchronization unit in accordance with an exemplary embodiment of the present invention.

Referring to FIG. 15, bit 7 is driven to the synchronization unit 600 during phase zero of the control clock, as indicated by state 534. Careful review of the state transition diagram, which illustrates the functionality of the serialization state machine 510, illustrates that the bits of the N-bit control pattern 446 are generated or selected a control clock period early. For example, bit 7 is selected during phase 7 ($\phi_7$) of the control clock 302, which is clocked to the interface during phase zero ($\phi_0$). Bit 6 is selected during phase one of the control clock 302 and is clocked to the interface during phase one. The embodiment of the serialization state machine 510, described with reference to FIG. 15, is designed to enable support of low latency I/O protocol or logic delays by the multi-mode I/O interface 500.

For example, when supporting a parallel-terminated, source-synchronous interface protocol, the multi-mode I/O interface 300 may not be able to ascertain whether transmission will occur during a next clock cycle until, for example, phase 6 ($\phi_6$) of the present cycle. Consequently, the serialization unit 500, as described with reference to FIG. 14, is modified to include latches 518 and 520 attached to control bits zero and one. This specific pattern generator can result in the change of control patterns during phase 6 before being serialized. Consequently, latches were added to bits zero and one, which are transmitted during phases 6 and 7 of the control clock 302 to prevent a new pattern from propagating through the serialization selection device 504 until a next clock cycle. Referring again to the serialization state machine 510, the latch is enabled during phases 1, 2, 3 and 4 of the control clock. This is somewhat arbitrary, as the only real requirement is the latch enable is deasserted through phases 6 and 7.

In order to implement this low latency protocol, the serialization state machine 510 also generates a pre-clock (PATGENCLK signal) 516. The PATGENCLK signal 516 produces a rising signal transition during phase 6 of the clock and a falling signal transition during phase 1 ($\phi_1$) of the control clock 302. This PATGENCLK signal 516 enables the transmit state machine 310 to sample the transmit signal 304 during phase 6 of the control clock 302 in order to ascertain whether transmission will begin during the next clock period.

Figure 16:
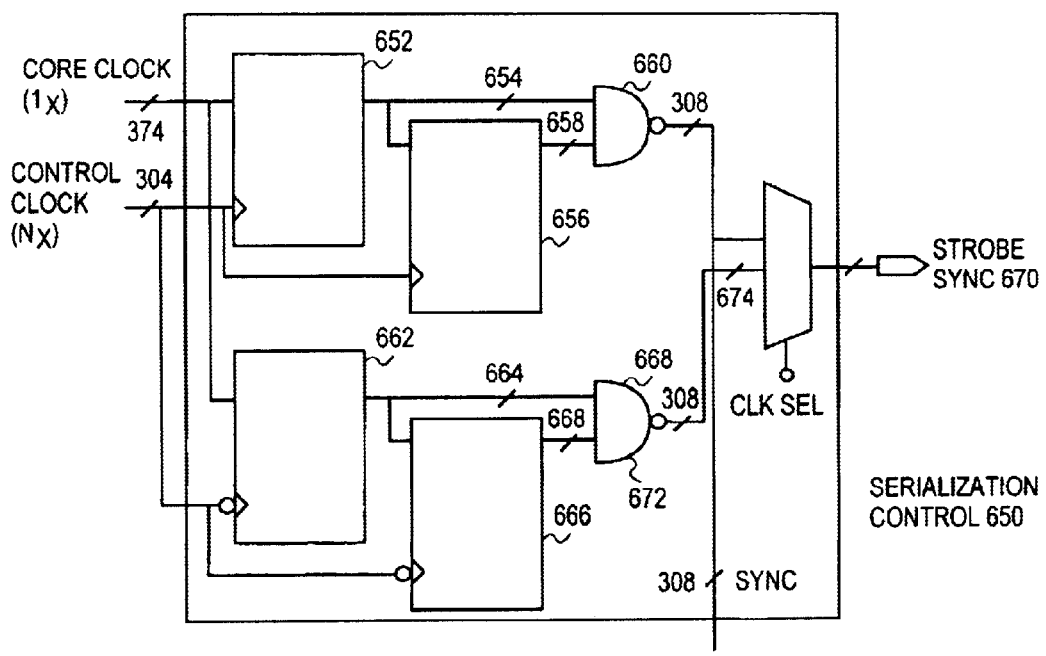
FIG. 16 is a block diagram illustrating a serialization control unit in accordance with an embodiment of the present invention.

The serialization state machine 510 also receives a sync signal 308, which is generated by a serialization control 650, as depicted with reference to FIG. 16. The serialization control 650 receives the core clock signal 314 and the control clock signal 302. The serialization control unit 650 is used to determine which phase of the control clock 302 is aligned to the core clock 314. This is accomplished by sampling the core clock with the control clock using a first flip-flop 652 to generate an output signal (Q0) 664, as described with reference to FIG. 17. The output signal Q0 664 is then delayed for a control clock signal using a second flip-flop 654 to generate a delayed output (Q1) signal 668. The Q1 signal 668 and the Q0 signal 664 are then received by a control gate, which performs a logical NAND operation on the Q0 signal 664 and the Q1 signal 668, to generate the sync signal 308. As described above, the sync signal is used to reset the serialization state machine 510. The serialization control unit 650 also includes a third flip-flop 662 and a fourth flip-flop 664 which are used to receive an inverted version of the control clock signal 314 in order to generate a strobe sync signal 670. The strobe sync signal 670 is used to implement source synchronous I/O protocols transmitting at N times the core clock frequency and described with reference to FIGS. 18A and 18B.

Figure 18A:
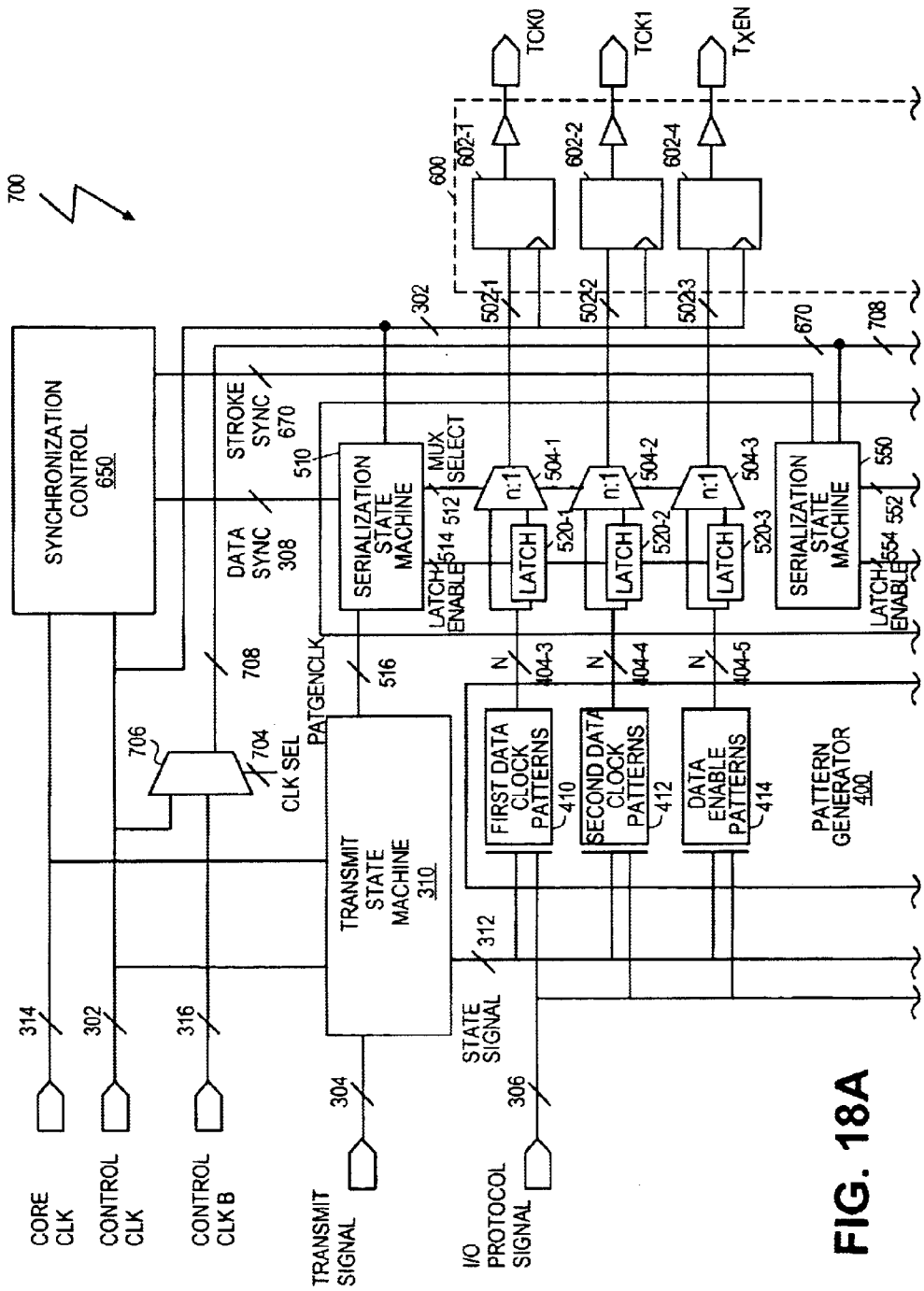
FIGS. 18A and 18B are block diagrams illustrating the multi-mode I/O interface in accordance with an exemplary embodiment of the present invention.
Figure 18B:
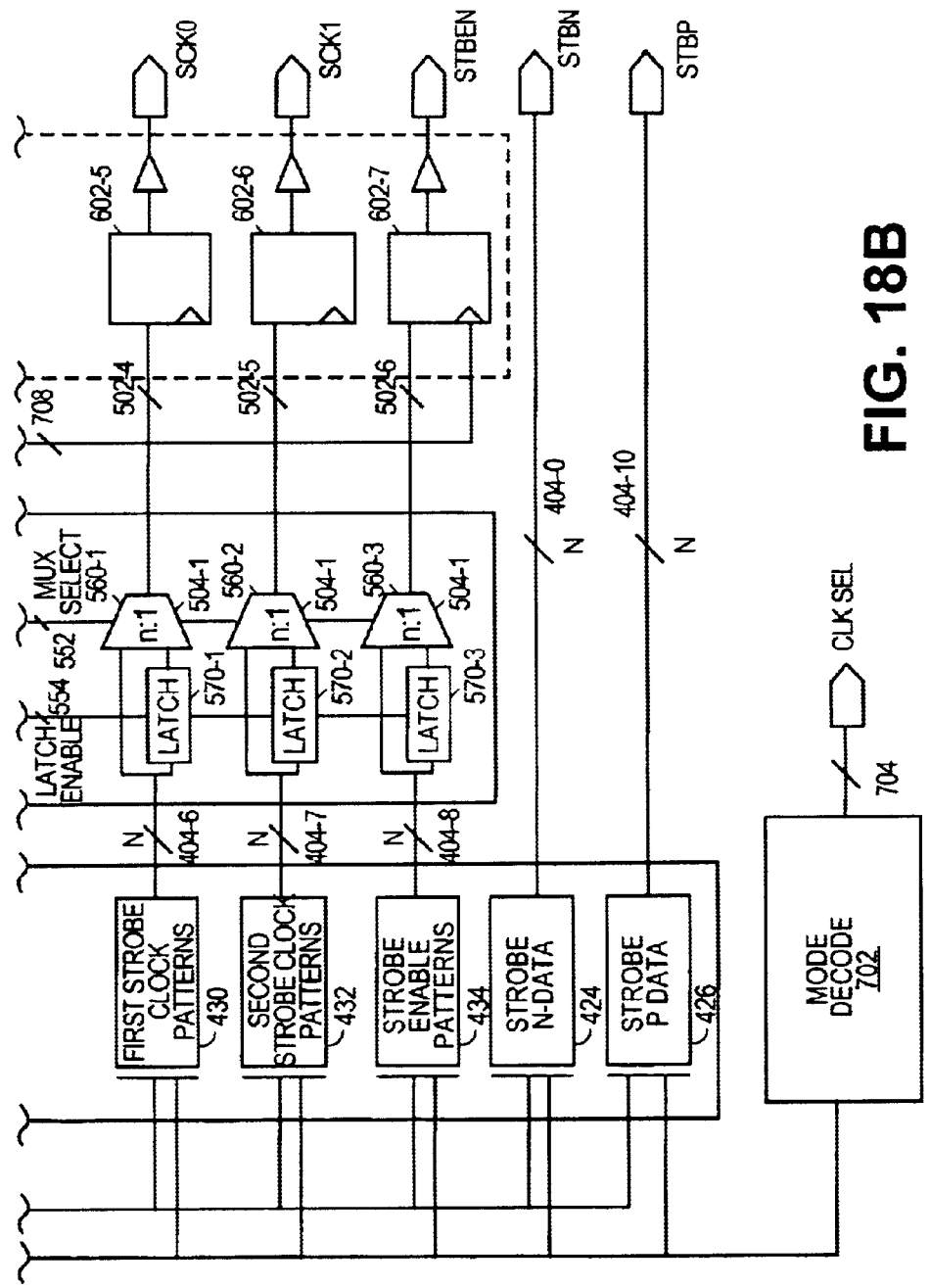

Referring now to FIGS. 18A and 18B, a block diagram is depicted illustrating a multi-mode I/O interface 700 in accordance with an exemplary embodiment of the present invention. The multi-mode I/O interface 700 is essentially as described with reference to FIG. 2, however, the transmit state machine 310 receives the PATGENCLK signal 516 from the serialization state machine 510. The pattern generator 400 is configured as described with reference to FIG. 10 in order to implement source synchronous I/O protocols transmitting at N times the core clock frequency. The pattern generation unit units (410, 412, 414, 430, 432, 434, 424 and 426) each generate an N-bit control pattern 404 (404-3, 404-4, 404-5, 404-6, 404-7 and 404-8), which are transmitted to the serialization unit 500. Each N-bit control pattern 404 is received by an input selection device 504 (504-1, 504-2, 504-3) and 560 (560-1, 560-2, 560-3). However, the serialization unit 500 includes input selection devices (504 and 560) and serialization state machines (510 and 550) for data clock patterns as well as strobe clock patterns (504 and 560).

In order to implement source synchronous I/O protocols transmitting at N times the core clock frequency, the serialization unit 500 receives the control clock signal (control CLK) 302 for the data control patterns and a control clock bar signal (control CLKB) 316 for the strobe clock control patterns. This requirement is imposed due to the fact that source synchronous I/O protocols require the strobe clock control signals to be in quadrature with the data clock control signals, as described with reference to FIGS. 11A–11D. Furthermore, this requirement is also imposed when using N-bit microcoded control patterns to generate clocks for N-times a core clock (Nx) data rate transmitters that are sensitive to the rising edge of the clock. In addition, the serialization unit 500 receives a strobe sync signal 670 generated by the synchronization control 650. As described with reference to FIGS. 14 and 15, once the serialization unit 500 receives each of the N-bit control patterns 404, the N-bit control patterns are serialized into a control clock domain and sequentially selected beginning with a most significant bit and completing with the least significant bit in response to mux selects 512 and 552. Once each of the N-bit control patterns are serialized, they are then transmitted to the synchronization unit 600.

Implementation of source-synchronous I/O protocols also requires the use of a mode decode block 702. The mode decode block enables a clock select signal 704 in response to the I/O protocol 306 for I/O protocols requiring transmission at N times the core clock frequency. The clock select signal is used by an input selection device 706 to route either the control clock signal 302 or a control clock bar signal 316 to the source-synchronous portion of the serialization unit 500, as described in further detail below. The mode decode block 702 may also be used as required by the various I/O protocols to implement static control signals. Such static control signals may include, for example, selection of various differential amplifiers for sensing inbound data, and selection of various inbound strobe pairs for sampling inbound data using different strobe buffers. The mode decode block 702 may also be used for termination control such that a signal may be generated corresponding to which output driver to activate, including for example, tri-state termination, PMOS termination or NMOS termination.

The synchronization unit 600 includes, for example, a flip-flop 602 (602-1, 602-2, 602-3, 602-4, 602-5, 602-6) for each pattern generator. Each flip-flop 602 receives the serialized N-bit control pattern 502, which is individually clocked, in response to the control clock signal 302 and the control clock bar signal 316 for N-times core clock transmission of source-synchronous protocols. Once synchronized into a control clock domain, the multi-mode I/O interface generates data buffer control signals. The data buffer control signals include a first data clock control pattern (TCK0) 720, a second data clock control pattern (TCK1) 722, and a transmit enable signal (TXEN) 724. The multi-mode I/O interface 700 also generates strobe buffer control signals, including a first strobe clock control pattern (SCK0) 726, a second strobe clock control signal (SCK1) 728, a strobe enable signal (STBEN) 730, as well as internal strobe signals (STBN) 734 and (STBP) 732. These signals are transferred to various data control buffers and strobe control buffers in order to implement transmission and receipt of data by the multi-mode I/O interface. By utilizing the microcoded N-bit pattern to form the various data and strobe buffer control signals, various I/O protocols including common clock protocols and source-synchronous protocols, requiring data transmission at up to N times a core clock frequency, are supported by the multi-mode I/O interface 700.

Figure 19B:
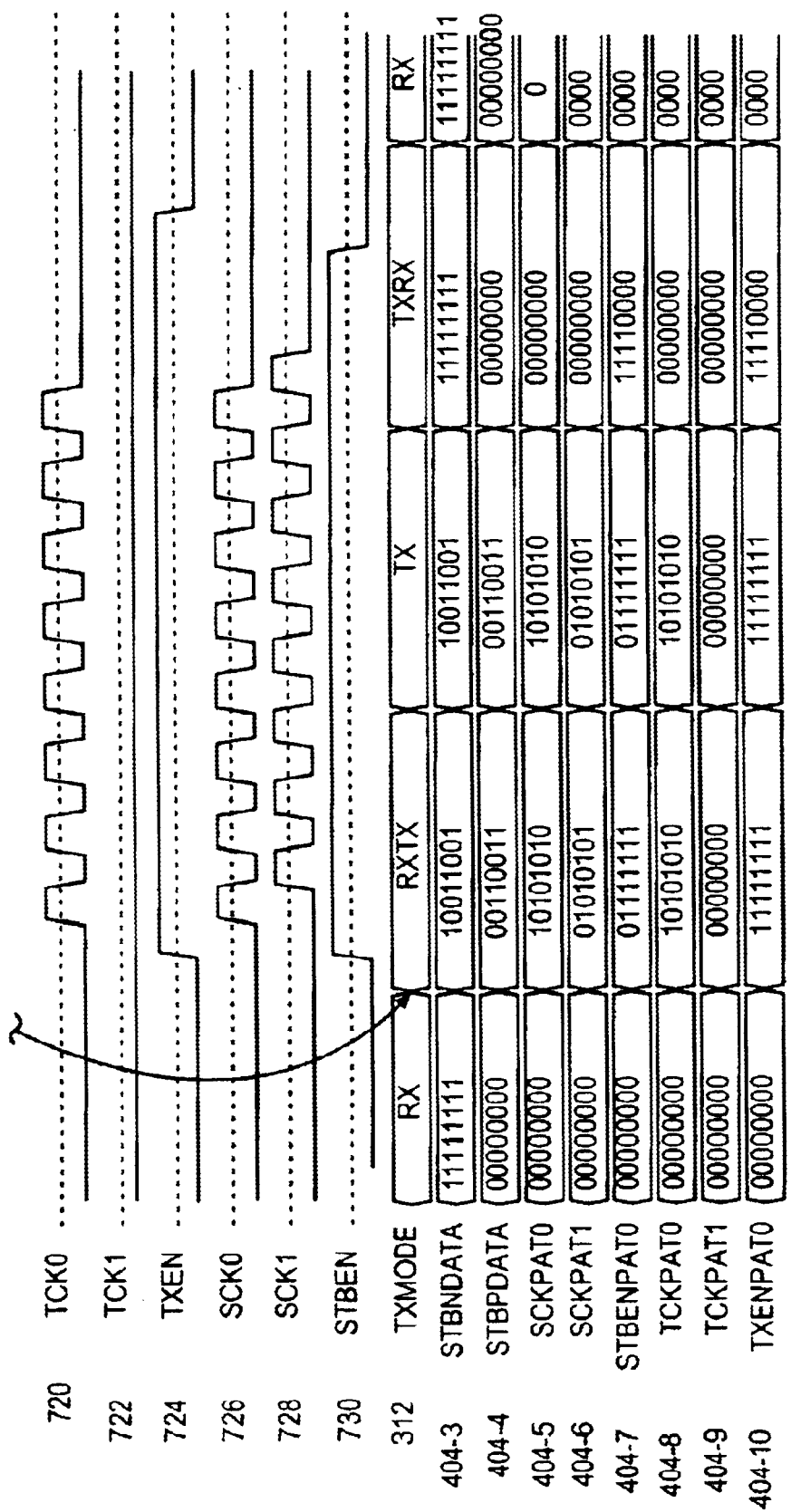

Referring now to FIGS. 19A and 19B, a timing diagram is depicted which illustrates the functionality of the multi-mode I/O interface 700, as described with reference to FIGS. 18A and 18B. In this embodiment, the control clock 302 (CLK 533) is running at eight times the core clock frequency 314 (CLK 66). As a result, the control clock 302 contains eight phases for each phase of the core clock 314. As described with reference to FIG. 15, a PATGENCLK signal 516 is generated by the serialization state machine during phase 6 of the control clock 302. In response to the accelerated graphics port (AGP), which requires transmission at four times the control clock frequency (AGP4x), the pattern generator 400 selects the following signals. Initially the state signal (TXMODE) 312 is in receive, or RX, mode. Consequently, the various pattern generation units are utilized.

However, the rising transition of the PATGENCLK 516 alerts the multi-mode I/O interface 700 that the state signal 312 will be transitioning to the RXTX mode, or receive transmission boundary. In response to the changed state signal 312, the STBN data pattern 404-3 and the STBP data 404-4 are selected to generate crossing strobe pairs, which align to the eye of the data 740, as indicated by the STP signal 732 and the STPBN signal 734. In addition, the first strobe clock control pattern (SCKPAT0) 404-5 is modified or selected to produce 4x clock transmission. Furthermore, the first data clock control pattern (TCKPAT0) is selected to generate 4x control clock transmission.

Figure 17:
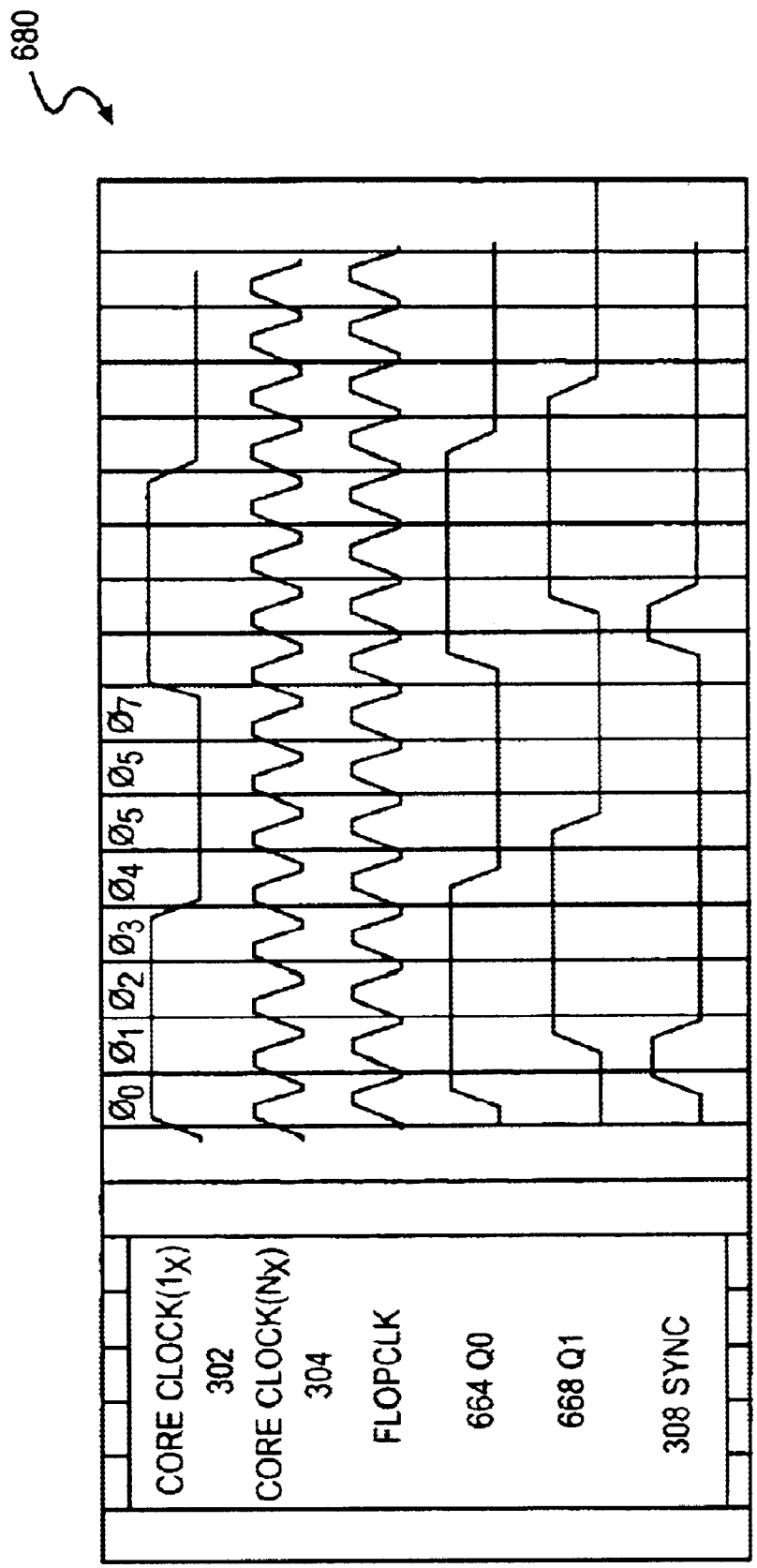
FIG. 17 depicts a timing diagram illustrating the functionality of the serialization control unit in accordance with the embodiment of the present invention.
Figure 20:
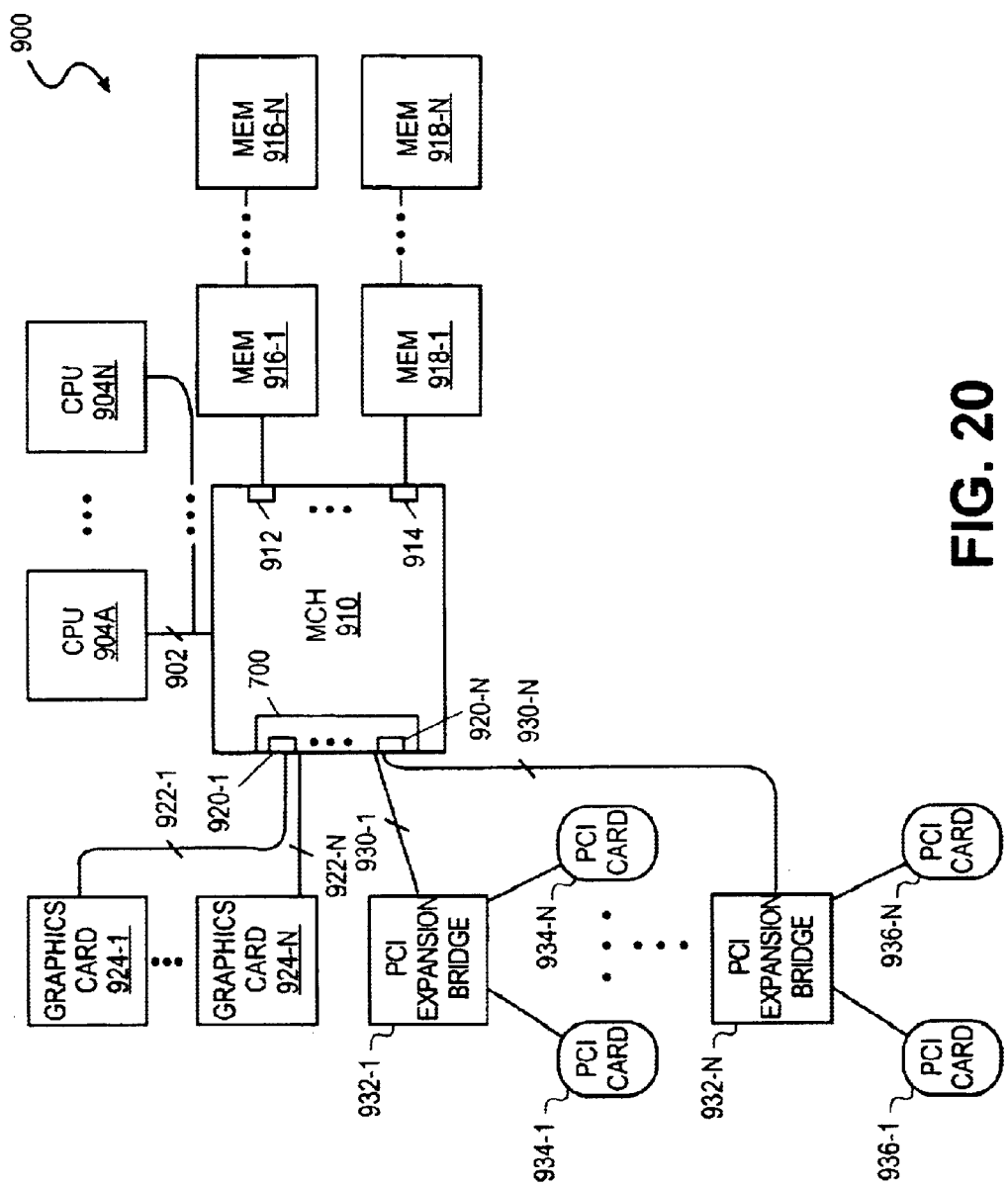
FIG. 20 depicts a block diagram illustrating a computer system utilizing a multi-mode I/O interface in accordance with an exemplary embodiment of the present invention.

Referring now to FIG. 20, a block diagram is depicted illustrating a computer system incorporating a multi-mode I/O interface 700, for example, as described with reference to FIG. 17. The computer system includes a memory controller hub (MCH) 910 having a front side bus 902 for coupling one or more processors 904 (904-A, 904-B, . . . , 904-N). The MCH 910 further includes one or more Rambus™ channels 912 . . . 914 for coupling one or more memories 916 (916-1, . . . 916-N) and 918 (918-1, . . . , 918-N). Finally, the MCH 910 includes the multi-mode interface 700, which includes one or more I/O ports 920 (920-1, . . . 920-N) for coupling both graphics cards and PCI expansion bridges to the memory controller hub 910.

As a result, the multi-mode I/O interface supports one or more AGP graphics ports 922 (922-1, . . . , 922-N) and one or more connections to a PCI expansion port bridge 930 (930-1, . . . 930-N). The AGP ports 922 interface one or more graphics cards 924 (924-1, . . . , 924-N) to the multi-mode I/O interface 700. In addition, one or more PCI expansion bridges 932 (932-1, . . . , 932-N) are coupled to the multi-mode I/O interface. Each PCI expansion bridge 932 includes one or more PCI cards 934 (934-1, . . . 934-N) and 936 (936-1, . . . , 936-N). Utilizing the teachings of the present invention, the multi-mode I/O interface 700 enables the MCH 910 to support both accelerated graphics protocols as well as other interface protocols. Consequently, utilizing the multi-mode I/O interface, a workstation could be designed to support both personal computer workstations platforms as well as server computer workstation platforms.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially matters of structure and management of parts within the principles of the present invention to the full extent indicated by the broad general meaning of the terms in which the appended claims are expressed. For example, the particular elements may vary depending on the particular application of the multi-mode I/O interface while maintaining substantially the same functionality without departing from the scope and spirit of the present invention.

In addition, although embodiments described herein are directed to a multi-mode I/O interface, it will be appreciated by those skilled in the art that the teaching of the present invention can be applied to other systems. In fact, virtually any I/O interface component utilizing microcoded interface control signals are within the teachings of the present invention, without departing from the scope and spirit of the present invention.

The present invention includes many advantages over conventional techniques. The present invention describes an approach where the behavior of every control signal required by an I/O protocol is defined as an N-bit control pattern. For example, as described above, in order to run a data buffer at 4× the control clock frequency, the pattern "10101010" would be sent to a serializer that creates an I/O clock going to a data buffer. In order to run the interface at a rate of two times the core clock frequency, the pattern would change to "11001100". In other words, a multi-mode interface, in accordance with the teachings of the present invention, is controlled through an mechanism wherein the behavior of the interface is defined through easily modifiable microcode. As a result, the multi-mode I/O interface may be reconfigured or modified without changing any underlying hardware. As taught by the present invention, the hardware is the various data and strobe buffers while the microcode is the set of N-bit interface control patterns that define the relationship of the transmitted data and timing signals. Furthermore, correcting logic bugs with this approach involves changing the bits in a data pattern and would not require modification of the I/O design buffer.

Having disclosed exemplary embodiments and the best mode, modifications and variations may be made to the disclosed embodiments while remaining within the scope of the invention as defined by the following claims.

What is claimed is:

1. A method comprising:
generating a state signal indicating a state of a multi-mode I/O interface in a next clock-cycle in response to a core clock signal, a control clock signal and a transmit signal using a transmission state-machine;
selecting, in response to the state signal and an I/O protocol signal, one or more N-bit control patterns from a plurality of N-bit control patterns, contained in a pattern generator;
serializing the one or more N-bit control patterns using a serialization unit;
synchronizing the one or more N-bit control patterns into a control clock domain using a synchronization unit to form one or more interface control signals generated by the I/O interface;
transmitting the one or more interface control signals to I/O buffers to enable transmission and receipt of data in accordance with an I/O protocol indicated by the I/O protocol signal.

2. The method of claim 1, wherein the generating of the state signal further comprises:
sampling the transmit signal from a core unit sending data to the multi-mode I/O interface using a pre-clock signal;
determining the state signal based on a current state of the I/O interface and the transmit signal; and
sending the state signal to the one or more pattern generation units.

3. The method of claim 1, further comprises:
reading mode-indicating signals from various configurations registers, package straps and system straps;
decoding the mode-indicating signals from the various configurations registers, package straps and system straps;
determining an I/O protocol as the I/O protocol signal using the mode-indicating signals from the various configurations registers, package straps and system straps; and transmitting the I/O protocol signal to the one or more pattern generation units.

4. The method of claim 1, wherein the serializing the one or more N-bit control patterns further comprises:
selecting a most significant bit from each of the one or more N-bit control patterns during a first phase of an N-phase control clock;
selecting a next-most significant bit from each of the one or more N-bit control patterns during a next-phase of the N-phase control clock; and
repeating the selecting a next most significant bit step for each bit within the one or more N-bit control patterns until a least significant bit of the one or more N-bit control patterns is selected during an Nth phase of the N-phase control clock.

5. The method of claim 1, further comprising:
using as the plurality of N-bit control patterns a series of data clock control patterns and a series of data enable control pattern for each I/O protocol supported by the multi-mode I/O interface, such that the series of data clock control patterns and the series of data enable control pattern include an N-bit control pattern for each transmission state defined by the state signal, thereby enabling support of standard I/O protocols by the multi-mode I/O interface.

6. The method of claim 5, further comprising:
using as the plurality of N-bit control patterns a series of strobe clock control patterns for each I/O protocol supported by the multi-mode I/O interface, such that the series of strobe clock control patterns include an N-bit strobe control pattern for transmission state defined by the TX-state signal, thereby enabling support of source-synchronous I/O protocols by the multi-mode I/O interface.

7. The method of claim 6, further comprising:
using as the series of data clock control patterns, a first series of data clock control patterns and a second series of data clock control patterns; and
using as the series of strobe clock control patterns, a first series of strobe clock control patterns and a second series of strobe clock control patterns in quadrature with the first and second series of data clock control patterns, such that multi-mode I/O interface enables source-synchronous I/O protocols transmitting at N-times a core clock frequency.

8. The method of claim 4, wherein the synchronizing the N-bit control patterns further comprises:
receiving a bit from each of the one or more N-bit control patterns; and clocking the bit to an output in response to a control clock running at N-times a frequency of the core clock.

9. A multi-mode I/O interface, comprising:
a transmit state machine receives a core clock signal, a control clock signal and a transmit signal to generate a state signal indicating a state of the I/O interface in a next clock-cycle;
a pattern generator including one or more pattern generation units to select, in response to the state signal and an I/O protocol signal, one or more N-bit control patterns from a plurality of N-bit control patterns, contained in the one or more pattern generation units;
a serialization unit to serialize the one or more N-bit control patterns selected by the one or more pattern generation units; and
a synchronization unit to receive the one or more N-bit control patterns from the serialization unit and synchronize the control patterns into a control clock domain to form one or more interface control signals generated by the multi-mode I/O interface and transmit the one or more interface control patterns to I/O buffers to enable transmission and receipt of data in accordance with an I/O protocol indicated by the I/O protocol signal.

10. The multi-mode I/O interface of claim 9, wherein the one or more pattern generation units further comprise:

a first data clock pattern generation unit containing a series of first data clock control patterns for each I/O protocol supported by the multi-mode I/O interface, such that the series of data clock control patterns include an N-bit data clock control pattern for each transmission state defined by the state signal; and a data enable pattern generation unit containing a series of data enable control patterns for each I/O protocol supported by the multi-mode I/O interface, such that the series of data enable control patterns include an N-bit data enable control pattern for each transmission state defined by the state signal generate, thereby enabling support of standard I/O protocols by the multi-mode I/O interface.

11. The multi-mode I/O interface of claim 10, wherein the one or more pattern generation units further comprise:

a strobe clock pattern generation unit containing a series of strobe clock control patterns for each I/O protocol supported by the multi-mode I/O interface, such that the series of strobe clock control patterns include an N-bit strobe clock control pattern for each transmission state defined by the state signal;

a strobe enable pattern generation unit containing a series of data enable control patterns for each I/O protocol supported by the multi-mode I/O interface, such that the series of strobe enable control patterns include an N-bit strobe enable control pattern for each transmission state defined by the state signal;

a first strobe signal pattern generation unit containing a first series of strobe signal control patterns for each I/O protocol supported by the multi-mode I/O interface, such that the first series of strobe signals include an N-bit pattern for each transmission state defined by the state signal; and a second strobe signal pattern generation unit containing a second series of strobe signal control patterns for each I/O protocol supported by the multi-mode I/O interface, such that the second series of strobe signals include an N-bit pattern for each transmission state defined by the state signal, the first and second series of strobe signals defining a series of strobe pairs, thereby enabling support of source-synchronous I/O protocols by the multi-mode I/O interface.

12. The multi-mode I/O interface of claim 9, wherein the one or more pattern generation units further comprise:

a first data clock pattern generation unit containing a series of first data clock control patterns for each I/O protocol supported by the multi-mode I/O interface, such that the series of first data clock control patterns include an N-bit first data clock control pattern for each transmission state defined by the state signal;

a second data clock pattern generation unit containing a series of second data clock control patterns for each I/O protocol supported by the multi-mode I/O interface, such that the series of second data clock control patterns include an N-bit second data clock control pattern for each transmission state defined by the TX-state signal; and a data enable pattern generation unit containing a series of data enable control patterns for each I/O protocol supported by the multi-mode I/O interface, such that the series of data enable control patterns include an N-bit data enable control pattern for each transmission state defined by the TX-state signal, thereby enabling support of I/O protocols transmitting at N-times a core clock frequency by the multi-mode I/O interface.

13. The multi-mode I/O interface of claim 12, wherein the one or more pattern generation units further comprise:

a first strobe clock pattern generation unit containing a series of first strobe clock control patterns for each I/O protocol supported by the multi-mode I/O interface, such that the series of first strobe clock control patterns include an N-bit first strobe clock control pattern for each transmission state defined by the state signal;

a second strobe clock pattern generation unit containing a series of second strobe clock control patterns for each I/O protocol supported by the multi-mode I/O interface, such that the series of second strobe clock control patterns include an N-bit second strobe clock control pattern for each transmission state defined by the state signal; and a strobe enable pattern generation unit containing a series of data enable control patterns for each I/O protocol supported by the multi-mode I/O interface, such that the series of strobe enable control patterns include an N-bit strobe enable control pattern for each transmission state defined by the state signal;

a first strobe signal pattern generation unit containing a first series of strobe signal control patterns for each I/O protocol supported by the multi-mode I/O interface, such that the first series of strobe signals include an N-bit pattern for each transmission state defined by the state signal; and a second strobe signal pattern generation unit containing a second series of strobe signal control patterns for each I/O protocol supported by the multi-mode I/O interface, such that the second series of strobe signals include an N-bit pattern for each transmission state defined by the state signal, the first and second series of strobe signals defining a series of strobe pairs, thereby enabling support of source-synchronous I/O protocols transmitting at N-times a core clock frequency by the multi-mode I/O interface.

14. The multi-mode I/O interface of claim 9, wherein each of the one or more pattern generation units further comprises:

a protocol multiplexor gate including an entry for each I/O protocol defined by the I/O protocol signal containing a series of N-bit control patterns coinciding with the I/O protocol of a respective entry; and a transmit state multiplexor gate for each entry of the protocol multiplexed gate, each transmit state multiplexor gate including an entry for each transmission state defined by the state signal, each entry containing an N-bit control pattern coinciding with the transmission state of the respective entry, such that the I/O protocol signal selects an entry of the protocol multiplexor gate based on an I/O protocol of the I/O protocol signal and the state signal selects an N-bit control pattern within an entry of the transmit state multiplexor gate based on a transmit state of the state signal within the selected I/O protocol.

15. The multi-mode I/O interface of claim 9, wherein the serialization unit further comprises:

one or more N to 1 multiplexor gates, each N to 1 multiplexor gate coupled to a respective pattern generation unit and receiving an N-bit control pattern selected by the respective pattern generation unit as inputs, such that the one or more N to 1 multiplexor gates collectively receive the one or more N-bit control patterns selected by the one or more pattern generation units; and a serialization state machine to generate mux-selects for each of the one or more N to 1 multiplexor gates, such that elements of the N-bit control patterns are selected sequentially, in response to each rising edge of the control clock, beginning with a most significant bit of the N-bit control patterns and ending with a least significant bit of the N-bit control patterns, thereby serializing the N-bit control patterns into a control clock domain.

16. The multi-mode I/O interface of claim 15, wherein the synchronization unit further comprises:

one or more synchronization flip-flops, each synchronization flip-flop coupled to a respective N to 1 multiplexor and receiving serialized bits from the N-bit control pattern serialized by the respective pattern generation unit as inputs, such that the one or more synchronization flip-flops collectively receive the serialized bits from the one or more N-bit control patterns selected by the one or more pattern generation units and provide the one or more N-bit control patterns as the interface control signals for controlling receipt and transmission of data by the I/O buffers.

17. The multi-mode I/O interface of claim 15, wherein the serialization unit further comprises:

one or more latches for holding a pair of least significant bits of the one or more N-bit control patterns, thereby allowing the one or more pattern generation units to modify a respective interface control pattern before the pair of least significant bits of a previous control pattern are serialized in response to the state signal, such that the serialization state machine generates a latch enable signal for the one or more latches.

18. A system comprising:

a front side bus for coupling one or more processors to a memory controller hub;

a memory interface for coupling one or more memories to the memory controller hub;

one or more I/O ports for coupling one or more peripheral components to the memory controller hub; and a multi-mode I/O interface for enabling transmission and receipt of data by the memory controller hub including:

a transmit state machine receives a core clock signal, a control clock signal and a transmit signal and generates a state signal indicating a state of the I/O interface in a next clock-cycle;

a pattern generator including one or more pattern generation units to select, in response to the state signal and an I/O protocol signal, one or more N-bit control patterns from a plurality of N-bit control patterns, contained in the one or more pattern generation;

a serialization unit to serialize the one or more N-bit control patterns selected by the one or more patent generation units; and a synchronization unit receives the one or more N-bit control patters from the serialization unit and synchronizes the control patterns into a control clock domain to form units one or more interface control signals generated by the multi-mode I/O interface and transmit the control patterns to I/O buffers to enable transmission and receipt of data in accordance with an I/O protocol indicated by the I/O protocol signal.

19. The system of claim 18, wherein the one or more pattern generation units further comprise:

a first data clock pattern generation unit containing a series of first data clock control patterns for each I/O protocol supported by the multi-mode I/O interface, such that the series of data clock control patterns include an N-bit data clock control pattern for each transmission state defined by the state signal; and a data enable pattern generation unit containing a series of data enable control patterns for each I/O protocol supported by the multi-mode I/O interface, such that the series of data enable control patterns include an N-bit data enable control pattern for each transmission state defined by the state signal, thereby enabling support of standard I/O protocols by the multi-mode I/O interface.

20. The system of claim 19, wherein the one or more pattern generation units further comprise:

a strobe clock pattern generation unit containing a series of strobe clock control patterns for each I/O protocol supported by the multi-mode I/O interface, such that the series of strobe clock control patterns include an N-bit strobe clock control pattern for each transmission state defined by the state signal; and a strobe enable pattern generation unit containing a series of data enable control patterns for each I/O protocol supported by the multi-mode I/O interface, such that the series of strobe enable control patterns include an N-bit strobe enable control pattern for each transmission state defined by the state signal generate; and a first strobe signal pattern generation unit containing a first series of strobe signal control patterns for each I/O protocol supported by the multi-mode I/O interface, such that the first series of strobe signals include an N-bit pattern for each transmission state defined by the state signal; and a second strobe signal pattern generation unit containing a second series of strobe signal control patterns for each I/O protocol supported by the multi-mode I/O interface, such that the second series of strobe signals include an N-bit pattern for each transmission state defined by the state signal, the first and second series of strobe signals defining a series of strobe pairs, thereby enabling support of source-synchronous I/O protocols by the multi-mode I/O interface.

21. The system of claim 18, wherein the one or more pattern generation units further comprise:

a first data clock pattern generation unit containing a series of first data clock control patterns for each I/O protocol supported by the multi-mode I/O interface, such that the series of first data clock control patterns include an N-bit first data clock control pattern for each transmission state defined by the state signal;

a second data clock pattern generation unit containing a series of second data clock control patterns for each I/O protocol supported by the multi-mode I/O interface, such that the series of second data clock control patterns include an N-bit second data clock control pattern for each transmission state defined by the state signal; and a data enable pattern generation unit containing a series of data enable control patterns for each I/O protocol supported by the multi-mode I/O interface, such that the series of data enable control patterns include an N-bit data enable control pattern for each transmission state defined by the state signal, thereby enabling support of I/O protocols transmitting at N-times a core clock frequency by the multi-mode I/O interface.

22. The system of claim 21, wherein the one or more pattern generation units further comprise:

a first strobe clock pattern generation unit containing a series of first strobe clock control patterns for each I/O protocol supported by the multi-mode I/O interface, such that the series of first strobe clock control patterns include an N-bit first strobe clock control pattern for each transmission state defined by the state signal;

a second strobe clock pattern generation unit containing a series of second strobe clock control patterns for each I/O protocol supported by the multi-mode I/O interface, such that the series of second strobe clock control patterns include an N-bit second strobe clock control pattern for each transmission state defined by the state signal;

a strobe enable pattern generation unit containing a series of data enable control patterns for each I/O protocol supported by the multi-mode I/O interface, such that the series of strobe enable control patterns include an N-bit strobe enable control pattern for each transmission state defined by the state signal;

a first strobe signal pattern generation unit containing a first series of strobe signal control patterns for each I/O protocol supported by the multi-mode I/O interface, such that the first series of strobe signals include an N-bit pattern for each transmission state defined by the state signal; and a second strobe signal pattern generation unit containing a second series of strobe signal control patterns for each I/O protocol supported by the multi-mode I/O interface, such that the second series of strobe signals include an N-bit pattern for each transmission state defined by the state signal, the first and second series of strobe signals defining a series of strobe pairs, thereby enabling support of source-synchronous I/O protocols transmitting at N-times a core clock frequency by the multi-mode I/O interface.

23. The system of claim 18, wherein each of the one or more pattern generation units further comprises:

a protocol multiplexor gate including an entry for each I/O protocol defined by the I/O protocol signal containing a series of N-bit control patterns coinciding with the I/O protocol of the respective entry; and a transmit state multiplexor gate for each entry of the protocol multiplexor gate, each transmit state multiplexor gate including an entry for each transmission state defined by the state signal, each entry containing an N-bit control pattern coinciding with the transmission state of the respective entry, such that the I/O protocol signal selects an entry of the protocol multiplexor gate based on an I/O protocol of the I/O protocol signal and the state signal selects an N-bit control pattern within an entry of the transmit state multiplexor gate based on a transmit state of the state signal within the selected I/O protocol.

24. The system of claim 18, wherein the serialization unit further comprises:

one or more N to 1 multiplexor gates, each N to 1 multiplexor gate coupled to a respective pattern generation unit and receiving an N-bit control pattern selected by the respective pattern generation unit as inputs, such that the one or more N to 1 multiplexor gates collectively receive the one or more N-bit control patterns selected by the one or more pattern generation units; and a serialization state machine to generate mux-selects for each of the one or more N to 1 multiplexor gates, such that elements of the N-bit control patterns are selected sequentially, in response to each rising edge of the control clock, beginning with a most significant bit of the N-bit control patterns and ending with a least significant bit of the N-bit control patterns, thereby serializing the N-bit control patterns into a control clock domain.

25. The system of claim 24, wherein the synchronization unit further comprises:

one or more synchronization flip-flops, each synchronization flip-flop coupled to a respective N to 1 multiplexor and receiving serialized bits from the N-bit control pattern serialized by the respective pattern generation unit as inputs, such that the one or more N synchronization flip-flops collectively receive the serialized bits from the one or more N-bit control patterns selected by the one or more pattern generation units and provide the one or more N-bit control patterns as the interface control signals for controlling receipt and transmission of data by the I/O buffers.

26. The system of claim 24, wherein the serialization unit further comprises:

one or more latches for holding a pair of least significant bits of the one or more N-bit control patterns, thereby allowing the one or more pattern generation units to modify a respective control pattern before the pair of least significant bits of a previous control pattern are serialized, such that the serialization state machine generates a latch enable signal for the one or more latches.

* * * * *